3,197,483
PREPARATION OF CYCLIC THIOETHERS
Bernard Buchholz, Flourtown, Thomas E. Deger, Ambler, and Roland H. Goshorn, Fort Washington, Pa., assignors to Pennsalt Chemicals Corporation, Philadelphia, Pa., a corporation of Pennsylvania
No Drawing. Filed July 30, 1962, Ser. No. 213,119
10 Claims. (Cl. 260—332.8)

This application is a continuation-in-part of application S.N. 38,462, filed June 24, 1960, and now abandoned.

This invention relates to the synthesis of cyclic thioethers by reaction of cyclic ethers with hydrogen sulfide in the presence of a uniquely promoted dehydration catalyst. Preferred embodiments of this invention are the preparation of thiophene, tetrahydrothiophene and their alkyl substituted derivatives.

Tetrahydrothiophene and thiophene are well-known compounds useful for various purposes. For example, tetrahydrothiophene is an odorant in fuel gas where it has particular value because of its superior oxidation stability as compared to mercaptans generally used for this purpose. It is also of value as a chemical intermediate to the sulfoxide of tetrahydrothiophene which is used to improve the ignition characteristics of diesel fuels. Its sulfone is a useful solvent particularly for extraction of aromatic compounds from petroleum. In adition, chlorinated tetrahydrothiophene has value as an insecticide, fungicide, and germicide. Likewise, thiophene and its derivatives have well known uses as solvents, chemical intermediates, plasticizers and the like.

It is known in the prior art to prepare tetrahydrothiophene by reaction of tetrahydrofuran with hydrogen sulfide using a dehydration catalyst such as alumina. Unfortunately, in this prior art reaction, when conditions conducive to high yields are used, the product obtained is highly colored due, probably, to the formation of impurities of unknown composition which are reaction by-products. As a result, it becomes necessary to remove these colored impurities and purification of the tetrahydrothiophene requires many additional inconvenient and expensive processing steps. In the recently issued patent to Bernard Loev and John T. Massengale issued August 11, 1959, as U.S. Patent 2,899,444, it is shown that by reacting tetrahydrofuran with hydrogen sulfide in the presence of an alumina catalyst under a narrow range of closely controlled conditions of temperature and tetrahydrofuran space velocity, the tetrahydrothiophene obtained is essentially free from colored impurities and is a high quality product. In this process of U.S. 2,899,444, the conditions of the reaction are limited to a tetrahydrofuran to hydrogen sulfide molar ratio from about 1:2 to about 1:6, a temperature between about 350° C. and about 380° C., and a space velocity of the tetrahydrofuran of from about 100 to about 110 gas volume/catalyst volume/hour. Under these conditions, the colorless tetrahydrothiophene product is obtained in conversions from about 70% to 94% based on the tetrahydrofuran fed into the system.

Thiophene and its derivates have been commercially prepared heretofore by reaction of an alkane, an alkene, or an alkadiene (such as butane, the butenes, or a butadiene) with a sulfur source such as hydrogen sulfide, elemental sulfur, sulfur oxides, or metal sulfides. In such processes the conversions frequently are low and many unwanted by-products result. For this reason, the process is difficult to handle commercially and is generally quite inefficient.

It has now been found that hydrogen sulfide and a cyclic ether selected from the class consisting of furan, a lower alkyl furan, tetrahydrofuran and a lower alkyl tetrahydrofuran may be reacted over a promoted dehydration catalyst such as alumina whereby improved yields and conversions to the sulfur analogues are obtained. In the case of tetrahydrofuran this process eliminates the necessity of maintaining limited process conditions as is required in the process of U.S. 2,899,444 described above. In addition, the process of this invention will yield products which are colorless and of exceedingly high purity, thus making unnecessary any involved separation and purification steps.

In accordance with this invention, thiophene, tetrahydrothiophene and their alkyl derivatives are prepared by reaction of the above described cyclic ether with hydrogen sulfide in the presence of a dehydration catalyst promoted with a heteropoly acid, its alkali metal salts or its alkaline earth metal salts.

The heteropoly acids and their salts used to make the promoted catalysts for use in the process of this invention are well-known compounds. They are defined by Sidgewick in his book, "The Chemical Elements and Their Compounds," vol. 11, page 1042 (1940), as those complicated structures in which a large number (usually 6, 9 or 12) of molybdic or tungstic acid residues are combined with a single residue of another acid selected from the group of oxy-acids of boron, silicon, germanium, titanium, zirconium, thorium, phosphorus, vanadium, arsenic and manganese. These heteropoly acids are usually hydrated with a large but definite number of water molecules, but the number of water molecules may range from 0 to as high as 70. Heteropoly acids are also described in U.S. 2,886,515 in terms of a central acid forming element and outer acid forming elements. The outer acid forming elements will be regarded as those which are attached to the central acid forming element of the acid forming functional group. The central acid forming element is any element which is at least trivalent and is capable of forming an oxygen containing compound which has acidic properties, and/or an analogous thio compound of acidic properties in which all or part of the oxygen atoms are replaced by sulfur. The outer acid forming elements are molybdenum, chromium, tungsten and vanadium. Many of the central acid forming elements can be selected from groups VA and VIA; whereas the outer acid forming elements can be chosen from groups VB and VIB of the periodic table. The central acid forming elements are, for example, phosphorus, germanium, tellurium, arsenic, aluminum, boron, silicon, manganese, cobalt, rhodium, chromium, selenium, iodine, platinum, antimony, etc. The heteropoly acids may be prepared readily by any of the methods given in "Inorganic Synthesis," vol. 1, 1st ed., pp. 129–133 (1939). Their alkali metal and alkaline earth metal salts are readily formed by reactintg an aqueous solution of the acid with an alkali metal or alkaline earth metal hydroxide or carbonate (e.g., NaOH, KOH, Ba(OH)$_2$, Ca(OH)$_2$, Sr(OH)$_2$, K$_2$CO$_3$, Cs$_2$CO$_3$, Rb$_2$CO$_3$, etc.). Some common heteropoly acids which may be used in this invention are phosphotungstic acid, phosphomolybdic acid, silicotungstic acid, borotungstic acid, and boromolybdic acid. Other useful heteropoly acids and their preparation are thoroughly discussed in U.S. Patent 2,886,515, and are specifically molybdenum acid iodate, $$H_2[I_2O_4(MoO_4)] \cdot 1H_2O$$

molybdenum acid selenite, $3SeO_2 \cdot 10MoO_3 \cdot XH_2O$; molybdenum acid arsenate, $As_2O_5 \cdot 18MoO_3 \cdot 38H_2O$;

$$Hg[M^{III}(MoO_4)_6] \cdot XH_2O$$

wherein X is 1 to 70 and M is a trivalent element selected from Al, Cr, Fe, Co, Mn or Rh; the ammonium acid salt of aluminum molybdate.

$(NH_4)_3H_6[Al(MoO_4)_6] \cdot 7H_2O$ molybdenum acid titanate, $TiO_2 \cdot 12MoO_3 \cdot 22H_2O$; molybdenum acid germanate, $GeO_2 \cdot 12MoO_3 \cdot 32H_2O$; molybdenum acid vanadate, $V_2O_5 \cdot 8MoO_3 \cdot 5H_2O$; the ammonium acid salt of thiovanadate-thiomolybdate, $(NH_4)_5H_3[H_2(MoS_4)_4(VS_3)_2] \cdot 10H_2O$ the ammonium acid salt of nickelous molybdate, $(NH_4)_4H_6[Ni(MoO_4)_6] \cdot 5H_2O$ the ammonium acid salt of cupric molybdate, $(NH_4)_4H_6[Cu(MoO_4)_6] \cdot 5H_2O$ the ammonium salt of ferric molybdate, $(NH_4)_3H_6[Fe(MoO_4)_6] \cdot 7H_2O$ the ammonium salt of rhodium molybdate, $(NH_4)_3H_6[Rh(MoO_4)_5] \cdot 7H_2O$ molybdenum acid platinate, $PtO_2 \cdot 10MoO_3 \cdot XH_2O$; chromium acid iodate, $2CrO_3 \cdot I_2O_5 \cdot 5H_2O$; the ammonium acid salt of phosphovanadate, $(NH_4)_5H_2[P(V_2O_6)_6] \cdot 21H_2O$. However, it is found that best results in the process of this invention are obtained with those heteropoly acids containing tungsten and the preferred catalysts for this process are phosphotungstic acid and silicotungstic acid on alumina and their alkali metal salts deposited on alumina.

The process to prepare the promoted catalysts for use in this invention is carried out quite readily. An appropriate dehydration catalyst such as alumina, titania, silica, chromia or those of other oxides such as tungsten, uranium, molybdenum, etc., is simply saturated with an aqueous solution containing a heteropoly acid or its alkali metal or alkaline earth metal salt. The aqueous mixture is agitated thoroughly to insure even distribution and after the liquid phase is removed, the dry solid is ready for use. The amount of heteropoly acid used will be such that from about 0.1% to 10% (preferably from 0.5% to 5%) by weight of the final dry catalyst composite is the heteropoly acid compound. When the amount of heteropoly acid is above about 10%, the process is operable, but the conversions to the thiophene compounds are significantly lower. Methods for making these catalysts are also disclosed in U.S. Patent 2,886,515.

These catalysts are easily handled and stable to storage, and after preparation and drying they have the physical appearance of the dehydration catalyst base from which they are made. They may be granulated to various sizes and used in the conventional manner in conventional catalytic equipment.

The means by which the process of this invention is carried out is simple and straightforward. The apparatus employed may be constructed of stainless steel and comprises the usual feed lines from which the reactant mixture is fed into a preheater tube in which the cyclic ether is volatilized. The preheater tube leads into a heated reactor, which may be preferably a cylindrical reactor, in which the catalyst bed is placed. The reactant gases pass through the catalyst bed and exit through a condenser cooled with ice or with a Dry Ice acetone mixture and the products are collected in a chilled receiver. The water layer is separated from the organic layer and the organic layer is then warmed to room temperature to remove any residual hydrogen sulfide. If desired, the product may be distilled, but this crude product is of such high quality that distillation is not necessary for many commercial uses.

The process is usually carried out at temperatures between about 175° C. and about 600° C. These temperatures refer to the temperature of the reactants as they contact the catalyst bed; i.e., the reactor temperature. Within the catalyst bed the temperature is somewhat higher by as much as 50° C. because of the heat evolved by the reaction. When temperatures much above about 400° C. are used to make tetrahydrothiophenes the product may contain some colored impurities although this can be minimized and controlled somewhat by using very high space velocities. On the other hand, temperatures below about 175° C. require exceedingly low space velocities in order to get significant conversion. Preferably, the temperature range for the process will be between about 250° and 375° C. for preparing the tetrahydrothiophenes and between about 300° and about 475° C. for preparing thiophenes.

The space velocity of the cyclic ether reactant may vary over a wide range. Space velocity is a measure of the rapidity with which a reactant is passed through the effective reaction zone; i.e. the zone in which conditions such as temperature, presence of catalyst and the like, are conducive to reaction. The higher the space velocity, the more reactant that passes through the reaction zone at a given time. For the process of this invention, the reaction zone is comprised of the catalyst bed, and the space velocity is measured as the gaseous volume of cyclic ether corrected to 0° C. and 1 atmosphere pressure per volume of catalyst per hour. Catalyst volume is taken as the gross volume of the catalyst bed. The space velocity for the reaction will usually be between about 10 and 150 cc./hr./cc. of catalyst, but may be as high as about 400 cc./hr./cc. of catalyst when the higher temperatures (e.g., about 400° C.) are used. In carrying out the process with a tetrahydrofuran and its alkyl derivatives, the space velocity will preferably be between 50 and 150 cc./hr./cc. of catalyst. In the process of obtaining thiophene and its alkyl derivatives, however, the furan reactant will be preferably passed through the catalyst bed at a much lower velocity, being in the order of 10 to 50 cc./hr./cc. of catalyst. Usually the process will be operated under a slight pressure of about 50 to 250 p.s.i.g., although the process is operable at atmospheric pressure or as high a pressure as will permit a vapor phase reaction at a given temperature and $H_2S$ ratio. However, pressures higher than above 300 p.s.i.g. are not necessary. The advantage of carrying out the reaction under a slight pressure is that the preferred, comparatively low, temperature range may be used without adversely affecting optimum conversion.

The molar ratio of reactants may also vary widely and it is preferred to use a ratio of hydrogen sulfide to cyclic ether greater than 1 although lower ratios such as 0.5:1 are also operable. With the lower ratios it is advisable to recover the excess cyclic ether while ratios above 20:1 are wasteful of hydrogen sulfide or require expensive recovery apparatus. Preferred ratios are from about 2:1 to 10:1.

It will be understood that in lieu of carrying out the reaction in a fixed bed reactor, fluid bed operation and other equipment and obvious process changes may be made without diminishing the efficiency and effectiveness of this invention.

The major advantage of the process of this invention over prior art methods is that exceptionally high conversions of the cyclic ether and extremely pure cyclic thioether product are obtained in a single pass, no recycle being required. Prior art methods to obtain tetrahydrothiophene give, at best, high purity materials in the range of 90–94% conversion, whereas the process of this invention operated under its preferred conditions gives conversions of 95–99%, with purity of the material 99% or over. In the case of thiophene compounds conversions by prior art methods are quite low, being on the order of 10% to 50% whereas the process of this conversion enables conversions from 60% to 95% with yields approaching 100%. Another advantage of the novel process of this invention is the long life of the catalyst used. Still another advantage of significance is the versatility of the process in that process conditions may be adjusted as needed to compensate for any one or more non-preferred conditions which may be dictated by economics, ease of operation, equipment availability, etc. In addition, this invention permits use of essentially identical equipment to make thiophenes and tetrahydrothiophenes.

In order to more fully illustrate and describe the invention, the following detailed examples are given.

EXAMPLE 1

In lieu of alumina as the dehydration catalyst in the a mole ratio of 6:1 is passed over a catalyst of 2% potassium phosphotungstate on alumina at 300° C. and 135 p.s.i.g. pressure. The hourly space velocity of the tetrahydrofuran is 105. The conversion to tetrahydrothiophene is 95% and the single-pass product after separation of the water of reaction and warming to remove $H_2S$ is high purity colorless material containing 99.5% by weight tetrahydrothiophene.

In lieu of alumina as the dehydration catalyst in the above example, thoria and silica promoted with the potassium salt of phosphotungstic acid may be used to give tetrahydrothiophene at somewhat lower conversions.

EXAMPLE 2

A mixture of hydrogen sulfide and tetrahydrofuran in a molar ratio of 6:1 is preheated to vaporize the tetrahydrofuran and passed into a reactor containing a catalyst of 2% by weight of phosphotungstic acid on alumina. Space velocity is 105 cc. of tetrahydrofuran vapor at S.T.P./hour/cc. of catalyst and the pressure and temperature of the reaction system are varied as shown in the following table:

Table I

| Reactor Temp., °C. | Pressure, p.s.i.g. | Percent Conversion to THT[1,3] | Analysis of Product—Mole Percent[4] | | | |
|---|---|---|---|---|---|---|
| | | | THT[1] | THF[2] | Thiophene | Unidentified Material |
| 175 | 135 | 12 | 15.7 | 84.2 | 0.0 | 0.0 |
| 200 | 135 | 34 | 55.4 | 43.5 | 0.0 | 0.5 |
| 250 | 135 | 91 | 97.1 | 2.3 | 0.0 | 0.6 |
| 300 | 135 | 97 to 99 | 99.1 | 0.0 | 0.2 | 0.7 |
| 320 | 135 | 97 | 98.8 | 0.0 | 0.3 | 1.3 |
| 335 | 135 | 96 | 97.1 | 0.0 | 0.6 | 1.3 |
| 350[5] | 135 | 97 | 98.7 | 0.0 | 0.6 | 1.3 |
| 365[5] | 135 | 93 | 97.5 | 0.0 | 1.7 | 0.7 |
| 375[5] | 135 | 92 | 97.7 | 0.0 | 2.2 | 0.3 |
| 300 | 60 | 96 | 97.7 | 0.2 | 0.0 | 0.2 |
| 320 | 60 | 97 | 99.4 | 0.22 | 0.0 | 0.2 |
| 330 | 60 | 95 | 99.6 | 0.03 | 0.03 | 0.22 |

[1] THT—Tetrahydrothiophene.
[2] THF—Tetrahydrofuran.
[3] Per pass based on THF.
[4] After separation of water layer and warming to remove dissolved $H_2S$, leaving colorless product.
[5] At these temperatures the THT product is very slightly colored, but colorless product is obtained by increasing the space velocity.

EXAMPLE 3

A mixture of hydrogen sulfide and tetrahydrofuran at a 6:1 mole ratio is continuously passed over a catalyst of 2% silicotungstic acid on alumina at a tetrahydrofuran space velocity of 120 cc./hr./cc. of catalyst. The reactor temperature is held at 320° C. and the pressure is 135 p.s.i.g. Conversions of tetrahydrofuran to tetrahydrothiophene in a single pass range from 95% to 97%. The product, after removal of water and dissolved $H_2S$ is colorless, contains 99% tetrahydrothiophene, and contains no tetrahydrofuran.

It is readily seen from the above examples and description of the invention that excellent conversions of tetrahydrofuran to high quality tetrahydrothiophene are obtained in a single pass within a wide range of reaction variables. It is also evident that the heteropoly acid promoted dehydration catalysts give essentially quantitative conversions of tetrahydrofuran at the optimum operating conditions.

EXAMPLE 4

A mixture of furan and $H_2S$ was passed continuously over a catalyst of 2.5% by weight of potassium phosphotungstate on activated alumina. Reaction conditions and results are given in the following Table II.

Table II

| Space Velocity (cc./hr./cc. of Catalyst) | Reactor Temperature (C.) | Pressure (p.s.i.g.) | Mole Ratio, $H_2S$/Furan | Percent Conversion To Thiophene | Percent Yield |
|---|---|---|---|---|---|
| 16 | 400 | 135 | 6/1 | 93 | 93 |
| 27 | 300 | 135 | 6/1 | 72 | 99 |
| 27 | 375 | 135 | 6/1 | 82 | 93 |
| 27 | 400 | 135 | 6/1 | 86 | 90 |
| 27 | 400 | 235 | 6/1 | 86 | 87 |
| 27 | 400 | 135 | 3/1 | 80 | 83 |
| 54 | 400 | 135 | 6/1 | 81 | 85 |

Instead of using potassium phosphotungstate in the above example, phosphotungstic acid was used at 375° to 400° C. with a 6:1 mole ratio, a space velocity of 27, and a pressure of 135 p.s.i.g. to yield thiophene at conversions ranging from 85% to 90%.

In the absence of the phosphotungstate promoter (i.e., with the activated alumina catalyst alone) Yuryev reports in J. Gen. Chem., U.S.S.R., vol. 10, 31 (1940), that at 400° C. a 30% conversion of furan to thiophene is obtained.

EXAMPLE 5

A mixture of $H_2S$ and 2-methylfuran in a 6:1 mole ratio was passed over a catalyst of 2.5% by weight potassium phosphotungstate on alumina at a space velocity of 18, at 135 p.s.i.g., and at a reactor temperature ranging from 350° to 400° C. The conversions and yields of high purity product is given in the following Table III:

Table III

| Reactor Temperature (C.) | 2-Methylthiophene | |
|---|---|---|
| | Percent Conversion | Percent Yield |
| 350 | 37 | 58 |
| 375 | 65 | 68 |
| 400 | 53 | 53 |

In the absence of the phosphotungstate promoter, conversions of 11% are obtained at 350° C.

EXAMPLE 6

A mixture of $H_2S$ and 2-methyltetrahydrofuran at a 6:1 mole ratio was passed over a catalyst of potassium phosphotungstate on alumina at a space velocity of 110, a pressure of 135 p.s.i.g., and at 300° C. Yield of 2-methyltetrahydrothiophene was 99% and conversion was 96%. In the absence of the heteropoly acid promoter, conversions of 69% are reported.

Instead of using the 2-methyl derivatives in Examples 5 and 6, other furans and tetrahydrofurans may be used such as the 2-ethyl, 3-ethyl, 2-isopropyl, 2,5-diethyl and 2-n-butyl derivatives.

It will be apparent to the skilled artisan that many modifications may be made from the above description without departing from the spirit and scope of the invention.

We claim:

1. A process for the preparation of cyclic thioethers which comprises reacting $H_2S$ with a cyclic ether selected from the class consisting of furan, lower alkyl furan, tetrahydrofuran and lower alkyl tetrahydrofuran by contacting vapors of said reagents with each other at a temperature between about 175° C. and about 600° C. in the presence of a metal oxide dehydration catalyst wherein the metal is selected from the group consisting of aluminum, silicon, chromium, tungsten, uranium and molybdenum promoted with an activating amount of a compound selected from the group consisting of a tungsten containing heteropoly acid, an alkali metal salt thereof, and an alkaline earth metal salt thereof.

2. A process for the preparation of tetrahydrothiophene which comprises a vapor phase reaction of tetrahydrofuran and hydrogen sulfide said process being carried out (1) in the presence of a catalyst consisting essentially of a metal oxide dehydration catalyst wherein the metal is selected from the group of aluminum, silicon, chromium, tungsten, uranium and molybdenum promoted with 0.1% to 10% by weight of the catalyst of a heteropoly acid compound selected from the group of tungsten containing heteropoly acids and their alkali metal and alkaline earth metal salts, (2) at a mole ratio of hydrogen sulfide to tetrahydrofuran between about 0.5:1 and about 20:1, (3) at a space velocity of tetrahydrofuran between about 50 and 400 cubic centimeters per hour per cubic centimeter of catalyst, and (4) at a reactor temperature between about 175° and about 400° C.

3. A process for the preparation of tetrahydrothiophene which comprises a vapor phase reaction of tetrahydrofuran and hydrogen sulfide, said process being carried out (1) in the presence of a catalyst consisting essentially of alumina promoted with 0.5% to 5% by weight of the catalyst of a heteropoly acid compound selected from the group of phosphotungstic acid, silicotungstic acid, and alkali metal salts of phosphotungstic and silicotungstic acid, (2) at a mole ratio of hydrogen sulfide to tetrahydrofuran between about 2:1 to 10:1, (3) at a space velocity of tetrahydrofuran between about 50 and about 150 cc./hr./cc. of catalyst, (4) at a reactor temperature between about 250° and about 375° C. and (5) at a pressure between about 50 and 250 p.s.i.g.

4. The process of claim 3 wherein the alumina is promoted with phosphotungstic acid.

5. The process of claim 3 wherein the catalyst is promoted with potassium phosphotungstate.

6. The process of claim 3 wherein the alumina is promoted with silicotungstic acid.

7. A process for the preparation of thiophene which comprises a vapor phase reaction of furan and hydrogen sulfide, said process being carried out (1) in the presence of a catalyst consisting essentially of alumina promoted with 0.5% to 5% by weight of the catalyst of a heteropoly acid compound selected from the group of phosphotungstic acid, silicotungstic acid and alkali metal salts of phosphotungstic and silcotungstic acid, (2) at a mole ratio of hydrogen sulfide to furan between about 2:1 to 10:1 (3) at a space velocity of furan between about 10 and 50 cc./hr./cc. of catalyst, (4) at a reactor temperature between about 300° and 475° C., and (5) at a pressure between about 50 and 250 p.s.i.g.

8. The process of claim 7 wherein alumina is promoted with potassium phosphotungstate.

9. The process of claim 1 where the cyclic ether is 2-methyltetrahydrofuran.

10. The process of claim 1 wherein the cyclic ether is 2-methylfuran.

References Cited by the Examiner

UNITED STATES PATENTS

| 2,425,096 | 8/47 | Ipatieff et al. | 260—668 |
| 2,547,380 | 4/51 | Fleck | 260—683.6 |
| 2,608,534 | 8/52 | Fleck | 260—683.2 |
| 2,899,444 | 8/59 | Loev et al. | 260—329 |
| 3,035,097 | 5/62 | Deger et al. | 252—458 |

OTHER REFERENCES

Jurjew, Berichte, vol. 69, pp. 1002–4 (1936).
Yuryev et al., Jour. Gen. Chem. (U.S.S.R.), vol. 21, pp. 819–24 (1951).

WALTER A. MODANCE, *Primary Examiner.*

NICHOLAS S. RIZZO, *Examiner.*

UNITED STATES PATENT OFFICE
CERTIFICATE OF CORRECTION

Patent No. 3,197,483

July 27, 1965

Bernard Buchholz et al.

It is hereby certified that error appears in the above numbered patent requiring correction and that the said Letters Patent should read as corrected below.

Column 1, line 28, for "adition" read -- addition --; column 2, line 55, for "reactintg" read -- reacting --; column 3, line 19, for "$(MoO_4)_5$" read -- $(MoO_4)_6$ --; column 5, line 5, strike out "In lieu of alumina as the dehydration catalyst in the", and insert instead -- A mixture of hydrogen sulfide and tetrahydrofuran in --; column 8, line 8, for "silcotungstic" read -- silicotungstic --; line 16, for "where" read -- wherein --.

Signed and sealed this 8th day of February 1966.

(SEAL)
Attest:

ERNEST W. SWIDER
Attesting Officer

EDWARD J. BRENNER
Commissioner of Patents